Dec. 15, 1970   F. SIROLA   3,546,759
CUTTING TOOL

Filed Nov. 1, 1967   2 Sheets-Sheet 1

INVENTOR
FRANK SIROLA
BY
ATTORNEYS

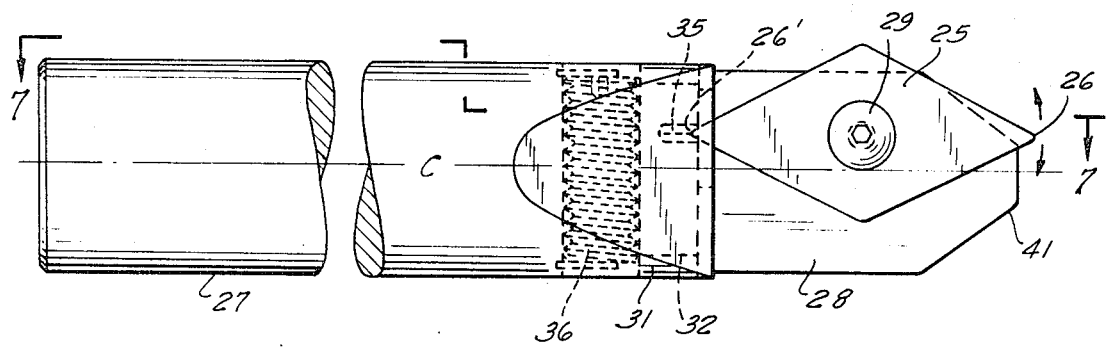
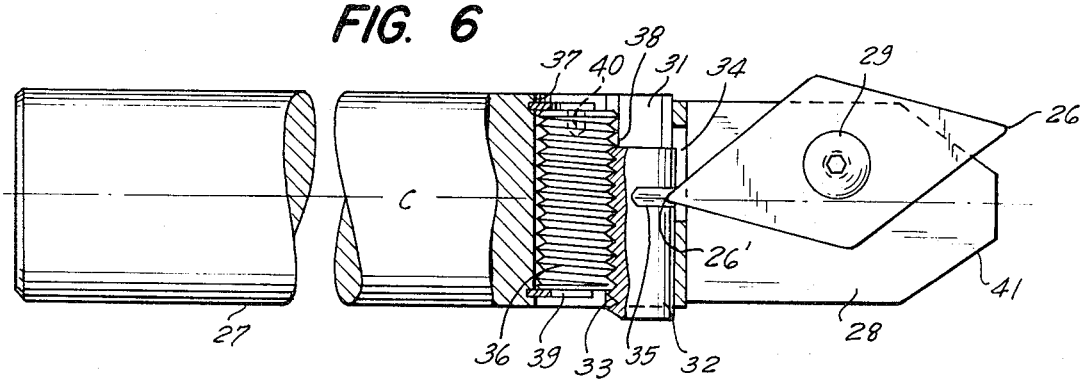
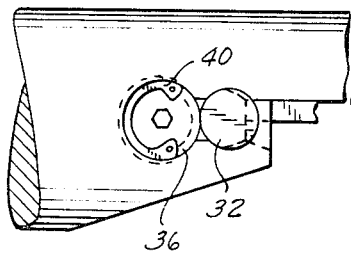
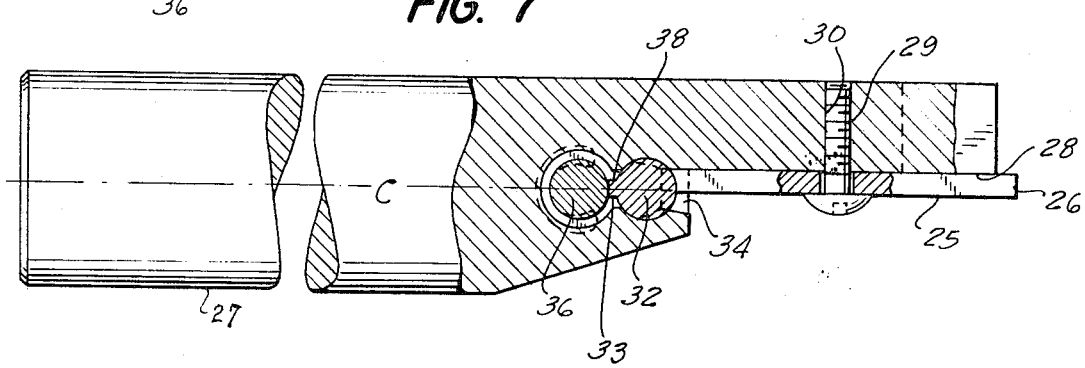
INVENTOR
FRANK SIROLA
BY Borat & Borat
ATTORNEYS United States Patent Office 3,546,759
Patented Dec. 15, 1970

3,546,759
CUTTING TOOL
Frank Sirola, 419 Getty Ave., Clifton, N.J. 07011
Filed Nov. 1, 1967, Ser. No. 679,924
Int. Cl. B23b 29/02; B26d 1/00
U.S. Cl. 29—98
4 Claims

ABSTRACT OF THE DISCLOSURE

A cutting tool for internal and external and facing which includes a tool holder such as a boring bar which is formed with a flat face or seat at the free end thereof which is located below the longitudinal center line of the bar. A cutter element having a plurality of cutting ends is pivotally mounted on said seat and is rotated to vary the position of one of the cutting ends by screw means mounted in an opening in said bar and operatively engaging another one of the cutting ends.

---

This invention relates to cutting tools and has particular reference to a cutting tool which is adapted for internal and external cutting and facing.

In the use of cutting tools the problem exists of presenting the cutting element to the face of the work at the proper angle and chamfer. This has been accomplished by grinding and sharpening the cutter element, adjusting the cutter element in the holder and the holder in the tool post and manipulating and adjusting the cross slide of the lathe. This problem exists also with the present day use of carbide cutters which necessitate the adjustment of the cutter holder in order to present the desired lead angle and depth of cut in the work.

The present invention provides a cutting tool with a cutter element which is mounted thereon for adjustment with the setting up of the work or at any time during the cutting operations to present the desired cutting angle thereto and for obtaining the desired depth of cut without change or adjustment of the position of the holder or the lathe slide.

Another object of the invention is to provide the cutting tool with screw means for varying the lead angle and the projecting relations of the cutting element mounted thereon.

Still another object of the invention is to provide a cutting tool which may be a boring bar for facing or enlarging bored holes and the like and which adjustably carries a cutter element such as a carbide insert having a plurality of cutter ends arranged with one of the ends in projecting relation for cutting and with another of the cutter ends engaged by manually operable means for varying the projecting relation and the lead angle of the cutting end.

For a better understanding of the invention together with other and further objects thereof, reference is made to the following description taken in connection with the accompanying drawings, in which FIG. 1 is an enlarged top plan view of a cutting bar constructed in accordance with the invention;

FIG. 5 is a view similar to FIG. 1 showing a modified form of the invention;

FIG. 6 is a view partly in section showing the cutter element turned with reference to the position thereof in FIG. 5;

FIG. 7 is a view taken on line 7—7 of FIG. 5; and

FIG. 8 is a fragmentary side view showing the operating mechanism in end view.

Figure 1:
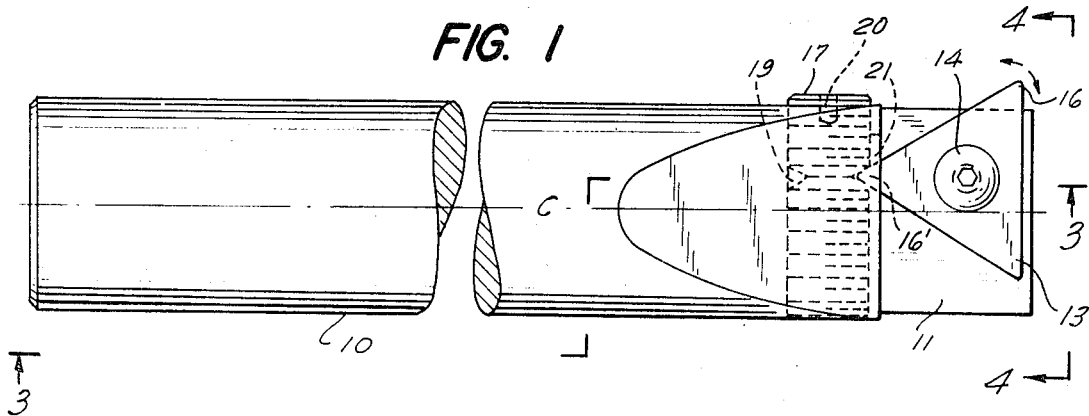

Referring to the drawings, the tool holder in the form of a boring bar 10 is formed with a flat face or seat 11 which is located at the free end thereof and is disposed somewhat below the longitudinal central axis C of the bar. A threaded aperture 12 opens through the seat 11 and is located at one side of the center of the seat. Mounted upon the seat 11 is a cutter element such as a carbide insert 13 which is releasably retained in position thereon by a screw stud 14 engaging through the central aperture 15 in the insert and threadedly engaging the aperture 12. The carbide insert is provided with a plurality of cutter ends and is arranged on the seat 11 with one of the cutter ends 16 disposed in projecting relation for cutting operation and with the upper face of the insert substantially in line with the longitudinal central axis C of the bar.

In order to adjust the carbide insert for varying the lead angle and the projecting relation of the cutter end 16, the bar 10 is provided with screw means disposed in operational engagement with the carbide insert for turning the same about the stud 14. As illustrated in FIG. 1 to FIG. 4 inclusive of the drawings, a screw 17 is longitudinally adjustable in a threaded opening 18 in the bar and is formed with an annular groove 19 disposed in engagement with one of the cutter ends 16' for turning the insert about the stud 14. The screw 17 is formed with a socket 20 at one end thereof which is adapted to be engaged by a socket wrench for turning the screw. By this construction the carbide insert can be disposed with any one of the cutter ends in cutting relation without varying the relation of the adjusting screw 17. It will be understood that turning the screw 17 will effect turning of the carbide cutter about the stud so as to project or retract the cutting end 16. As illustrated in FIG. 2, the carbide cutter has been turned to dispose the cutting end 16 thereof in greater projecting relation than that shown in FIG. 1. The screw 17 is arranged with the center line thereof extending substantially through the center line C of the bar. The wall of the threaded opening 18 is cut away adjacent the seat 11 to provide a slot 21 through which the cutter end 16' projects into engagement in the groove 19.

Figure 2:
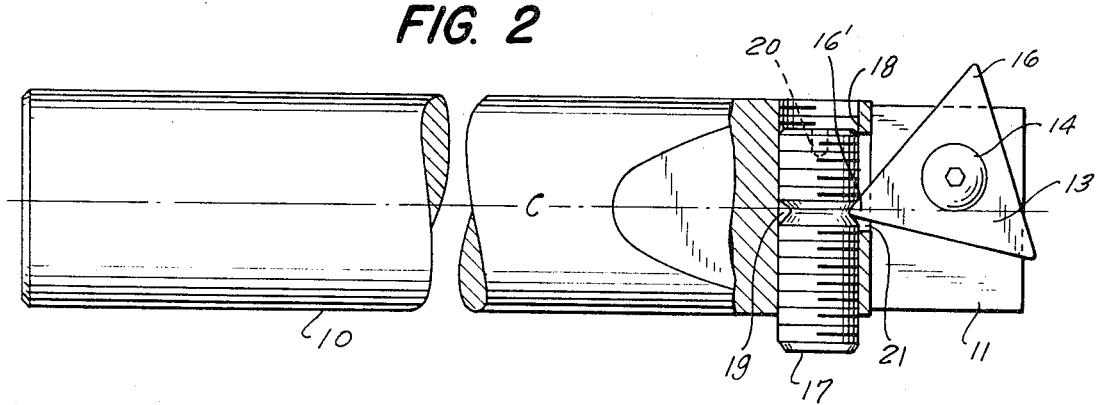
FIG. 2 is a similar view partly broken away showing the cutter element turned to dispose one of the cutter ends in greater projecting relation than shown in FIG. 1.
Figure 3:
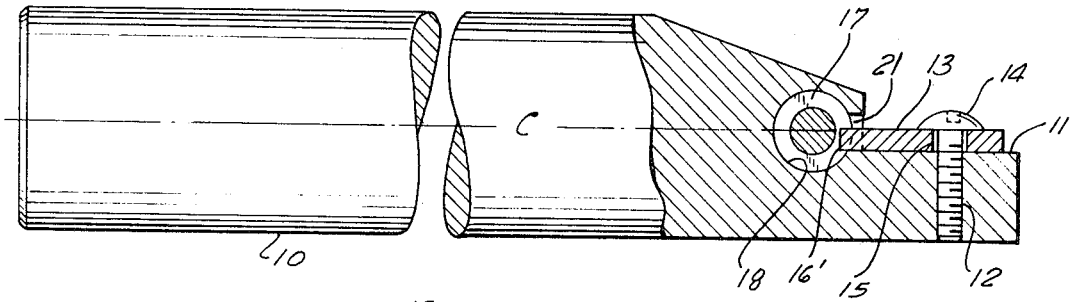
FIG. 3 is a view partly in section taken along line 3—3 of FIG. 1.
Figure 4:
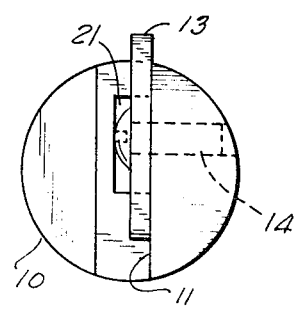
FIG. 4 is an end view taken on line 4—4 of FIG. 1.

In the use of a carbide insert with three cutter ends such as shown in plan in FIGS. 1 and 2, one of the cutter ends projects laterally for the cutting operation. A carbide insert 25 with four cutter ends may be employed as shown in FIGS. 5 to 8 inclusive of the drawings with one of the cutter ends 26 projecting forwardly of the boring bar 27 for the cutting operation. In this form of the invention the insert is flatly supported upon a flat face or seat 28 at the forward end of the bar and is released by a screw stud 29 which threadedly engages in the threaded aperture 30 similarly to the arrangement in the previously described form of the invention.

In this form, however, the bar 27 is formed with a transversely extending guideway 31 in which a rack bar 32 having rack teeth 33 is mounted for reciprocatory movement. The wall of the guideway 31 is slotted as at 34 through which the inwardly directed cutter end 26' of the insert protrudes into engagement with a groove 35 in the rack bar for imparting turning movement to the insert with the movement of the rack bar.

The rack bar is moved by a screw 36 swivelly mounted in a bored opening 37 in the bar 27 and which extends parallel with the guideway 31. The wall of the opening 37 is provided with a slot 38 which opens into the guideway and through which extends the rack teeth 33 into engagement with the screw 36. The screw 36 is retained in the opening 37 by split rings 39 and is adapted to be manually turned to adjust the cutter end 26 by a socket wrench engaging the socket 40. In turning the carbide insert about the stud 29, the cutter end 26 is moved to and from the position shown in FIG. 5, to the position thereof shown in FIG. 6, for varying the depth of the cut and the lead angle thereof. The end of the bar 27 is cut away at its opposite sides to provide a tapered end 41 for clearance of the work in cutting. There is thus provided a cutting tool for horizontal and vertical boring and cutting in a boring mill, drill press, gig bore and milling machine.

What is claimed is:

1. A cutting tool including a bar having a flat seat at its outer end located below the longitudinally extending medial line of the bar, a centrally apertured multifaced cutter element having its faces meeting in angular relation providing cutting ends, means engaging said apertured cutter element releasably securing said cutter element on said seat with one of said cutting ends projecting beyond said bar and about which means said cutter element is adjustable when released, said bar having a transversely extending aperture with a side opening in the wall thereof, and screw actuated means adjustable in said aperture and engaging one of said cutter ends proturding through said side opening for turning said cutter element to vary the extent of projection of said projecting cutter end and the lead angle thereof.

2. A cutting tool to be held in a machine for horizontal and vertical boring and cutting including a bar having a seat at one end, a cutter element mounted on said seat, a stud engaging through said cutter element and secured in said bar for releasably holding said cutter element on said seat and about which stud said cutter element is rotatable when said stud is released, said cutter element having a cutting end projecting outwardly beyond said seat, and screw means arranged in an opening in said bar, and said cutter element having another cutting end projecting through a slot in said bar into direct engagement with said screw means for turning said cutter element with the manual turning of said screw means.

3. A cutting tool to be held in a machine for horizontal and vertical boring and cutting including a bar having a seat at one end, a cutter element mounted on said seat, a stud engaging through said cutter element and secured in said bar for releasably holding said cutter element on said seat and about which stud said cutter element is rotatable when said stud is released, said cutter element having a plurality of cutting ends, and said bar being formed with a transversely extending threaded opening with a side slot in the wall thereof which opens outwardly above said base, and screw means including a screw formed with a peripheral groove and arranged in said threaded opening, and said cutter element having one of said cutting ends projecting through said side slot into engagement in said peripheral groove for turning said cutter element with the turning of the screw.

4. A cutting tool as set forth in claim 1, in which said screw actuated means includes a rack bar and a screw arranged in said transversely extending aperture in operable engagement with the rack bar disposed in engagement with the cutter end protruding through said side opening.

References Cited

UNITED STATES PATENTS

| 1,459,805 | 6/1923 | Tasker | 29—98 |
| 2,525,819 | 10/1950 | McGregor | 29—98 |
| 3,063,132 | 11/1962 | Binns | 29—98 |

HARRISON L. HINSON, Primary Examiner

U.S. Cl. X.R.

29—96; 77—58